US012571185B2

(12) United States Patent
Bruflodt et al.

(10) Patent No.: US 12,571,185 B2
(45) Date of Patent: Mar. 10, 2026

(54) PROPEL LIMITING SYSTEM AND METHOD FOR REAR COLLISION AVOIDANCE

(71) Applicant: DEERE & COMPANY, Moline, IL (US)

(72) Inventors: Rachel Bruflodt, Dubuque, IA (US); Giovanni A Wuisan, Epworth, IA (US); Michael Kean, Maquoketa, IA (US); Brett S Graham, Dubuque, IA (US)

(73) Assignee: Deere & Company, Moline, IL (US)

( * ) Notice: Subject to any disclaimer, the term of this patent is extended or adjusted under 35 U.S.C. 154(b) by 728 days.

(21) Appl. No.: 17/544,256

(22) Filed: Dec. 7, 2021

(65) Prior Publication Data

US 2023/0175235 A1     Jun. 8, 2023

(51) Int. Cl.
| | |
|---|---|
| *E02F 9/24* | (2006.01) |
| *B60W 30/09* | (2012.01) |
| *E02F 9/26* | (2006.01) |

(52) U.S. Cl.
CPC .............. *E02F 9/24* (2013.01); *B60W 30/09* (2013.01); *E02F 9/262* (2013.01); *B60W 2300/17* (2013.01)

(58) Field of Classification Search
CPC ... E02F 9/24; E02F 9/262; E02F 3/431; E02F 9/2045; E02F 9/2033; B60W 30/09; B60W 2300/17; G05D 1/0214
See application file for complete search history.

(56) References Cited

U.S. PATENT DOCUMENTS

2007/0267526 A1* 11/2007 Uhrich .................... F16P 3/003
                                                                    241/30
2017/0282915 A1* 10/2017 Kim ...................... B60W 30/08
(Continued)

FOREIGN PATENT DOCUMENTS

| DE | 102020210159 A1 | 3/2021 |
|---|---|---|
| DE | 102020126750 A1 | 5/2021 |
| DE | 102021201728 A1 | 9/2021 |

OTHER PUBLICATIONS

German Search Report issued in application No. DE102022209240.6 dated May 11, 2023 (14 pages).

*Primary Examiner* — Russell Frejd
*Assistant Examiner* — Ana D Thomas
(74) *Attorney, Agent, or Firm* — Taft Stettinius & Hollister LLP; Stephen F. Rost

(57) ABSTRACT

A rear collision avoidance system and method for a machine with left and right side traction devices for moving the machine. Sensors monitor obstacles around the machine. A commanded reverse path is calculated based on operator traction device commands. If an obstacle is in the commanded reverse path, the system automatically adjusts the traction device commands to avoid collision with the obstacle. A time to collision can be calculated, and the traction device commands adjusted only when it is below a threshold. Adjusting the traction device commands to avoid collision can include determining reverse propel and steer components based on the traction device commands; and if the reverse propel is greater than a propel threshold then adjusting the traction device commands to reduce reverse propel but maintain the reverse path; and if steer is greater than propel then adjusting the traction device commands to reduce reverse propel.

18 Claims, 3 Drawing Sheets

(56) References Cited

U.S. PATENT DOCUMENTS

| | | | | |
|---|---|---|---|---|
| 2020/0041999 A1* | 2/2020 | Pfaff | .................... | G05D 1/00 |
| 2021/0157465 A1* | 5/2021 | Turk | .................... | G06F 3/017 |
| 2021/0339758 A1* | 11/2021 | Laperle | .................. | E02F 9/267 |
| 2021/0363727 A1* | 11/2021 | Hirayama | ............. | E02F 9/2045 |
| 2024/0301657 A1* | 9/2024 | Sonoda | ................ | E02F 9/2045 |

* cited by examiner

PROPEL LIMITING SYSTEM AND METHOD FOR REAR COLLISION AVOIDANCE

FIELD OF THE DISCLOSURE

The present disclosure relates to machine collision avoidance, and more specifically relates to rear collision avoidance systems for machines.

BACKGROUND

Machines often have to be steered close to various obstacles and barriers. Some small machines, such as compact track loaders or skid steers, frequently need to be maneuvered very close to walls or objects in order to work efficiently. This makes automatic collision avoidance challenging to implement for various machines, since the collision avoidance system must prevent the machine from contacting obstacles while still allowing it to get close to obstacles.

Machines can have various drive and steering mechanisms. For example, a differentially steered machine, such as a compact track loader or skid steer, typically has separate drive assemblies for the wheels or tracks on each side of the machine. The motion or trajectory of a machine can be thought of as having a propel, radial or straight line forward/backward component, and a steer, transverse or lateral component that are commanded by the operator. For a differentially steered machine, the propel component can be thought of as the average of the two tracks' speeds and the steer component can be thought of as their difference. Since the rear of a machine is typically less visible to an operator, and the operator may be focusing their attention on the front of the machine, operators can sometimes drive the rear of the machine into walls or other obstacles while trying to steer.

It would be desirable to have a rear collision avoidance system that detects the presence of obstacles behind a machine, and that prevents or mitigates collision with the obstacles by limiting the propel component of the machine's motion.

SUMMARY

A rear collision avoidance method is disclosed for a machine having left and right side traction devices for moving the machine, where the machine also has a front end and a tail end. The method includes monitoring obstacles behind the machine using sensors; monitoring operator traction device commands for the left and right side traction devices; determining an operator commanded reverse path for the machine based on the operator traction device commands; determining whether an obstacle detected by the sensors is in the operator commanded reverse path; and if the obstacle is in the operator commanded reverse path, automatically adjusting the operator traction device commands to avoid collision with the obstacle. Automatically adjusting the operator traction device commands to avoid collision with the obstacle can include determining a time to collision with the obstacle based on the operator traction device commands; and if the time to collision with the obstacle is below a time to collision threshold, automatically adjusting the operator traction device commands to avoid collision with the obstacle.

Automatically adjusting the operator traction device commands to avoid collision with the obstacle can include determining an operator commanded reverse propel component and an operator commanded steer component for the machine based on the operator traction device commands. The operator commanded reverse propel component can be an average of the operator commanded reverse speeds for the left and right side traction devices. The operator commanded steer component can be a difference between the operator commanded speeds for the left and right side traction devices.

If the operator commanded reverse propel component is greater than a propel threshold, the method can include adjusting the operator traction device commands to reduce the reverse propel component to avoid collision with the obstacle while maintaining the operator commanded reverse path. If the operator commanded reverse propel component is less than or equal to the propel threshold, the method can include adjusting the operator traction device commands to reduce the reverse propel component to avoid collision with the obstacle. Adjusting the operator traction device commands to reduce the reverse propel component to avoid collision with the obstacle while maintaining the operator commanded reverse path can include calculating an allowed reverse propel component that avoids collision with the obstacle based on the time to collision with the obstacle; calculating an allowed steer component so that the ratio of the allowed reverse propel component to the allowed steer component is substantially the same as the ratio of the operator commanded reverse propel component to the operator commanded steer component; and adjusting the operator commands for the left and right side traction devices to implement the calculated allowed reverse propel component and the calculated allowed steer component. Adjusting the operator traction device commands to reduce the reverse propel component to avoid collision with the obstacle can include maintaining the operator commanded steer component; and reducing the operator commanded reverse propel component to avoid collision with the obstacle.

Adjusting the operator traction device commands to reduce the reverse propel component to avoid collision with the obstacle while maintaining the operator commanded reverse path can include continuously monitoring the operator commands for the left and right side traction devices; continuously determining the operator commanded reverse propel component and the operator commanded steer component for the machine based on the latest operator commands for the left and right side traction devices; continuously determining the operator commanded reverse path for the machine based on the latest operator commands for the left and right side traction devices; continuously determining whether the obstacle detected by the sensors is in the operator commanded reverse path; and continuously determining a time to collision with the obstacle. If the time to collision with the obstacle is below the time to collision threshold, the method can include continuously adjusting the operator traction device commands to reduce the reverse propel component to avoid collision with the obstacle.

The rear collision avoidance method can also include checking for an operator override command; and when the operator override command is detected, not adjusting the operator commands for the left and right side traction devices to avoid collision with the obstacle.

A rear collision avoidance system is disclosed for a machine that has left and right side traction devices to move the machine, and that has a front end and a tail end, and a vehicle controller. The tail swing collision avoidance system includes sensors and a rear collision controller. The sensors are configured to detect obstacles behind the machine. The rear collision controller is configured to monitor operator commands for the left and right side traction devices, determine an operator commanded reverse path for the machine based on the operator commands for the left and right side traction devices, and determine whether an obstacle detected by the sensors is in the operator commanded reverse path. If the obstacle is in the operator commanded reverse path, the rear collision controller is configured to adjust the operator commands for the left and right side traction devices to avoid collision with the obstacle. If the obstacle is in the operator commanded reverse path, the rear collision controller can be configured to determine a time to collision with the obstacle based on the operator commands for the left and right side traction devices; and only adjust the operator commands for the left and right side traction devices when the time to collision with the obstacle is below a time to collision threshold.

If the obstacle is in the operator commanded reverse path, the rear collision controller can be configured to determine an operator commanded reverse propel component and an operator commanded steer component for the machine based on the operator commands for the left and right side traction devices. If the operator commanded reverse propel component is greater than a propel threshold, the rear collision controller can be configured to adjust the operator commands for the left and right side traction devices to reduce the reverse propel component to avoid collision with the obstacle and maintain the operator commanded reverse path. If the operator commanded reverse propel component is less than or equal to the propel threshold, the rear collision controller can be configured to adjust the operator commands for the left and right side traction devices to reduce the reverse propel component to avoid collision with the obstacle.

If the operator commanded reverse propel component is greater than the propel threshold, the rear collision controller can be configured to calculate an allowed reverse propel component that avoids collision with the obstacle; calculate an allowed steer component so that the ratio of the allowed reverse propel component to the allowed steer component is substantially the same as the ratio of the operator commanded reverse propel component to the operator commanded steer component; and adjust the operator commands for the left and right side traction devices to implement the calculated reverse propel component and the calculated steer component. If the operator commanded reverse propel component is less than or equal to the propel threshold, the rear collision controller can be configured to maintain the operator commanded steer component, and reduce the operator commanded reverse propel component to avoid collision with the obstacle.

The rear collision controller can be configured to communicate with the vehicle controller to monitor the operator commands for the left and right side traction devices. The rear collision controller can be configured to send adjusted commands for the left and right side traction devices to the vehicle controller to avoid collision with the obstacle. The rear collision avoidance system can also include an operator override control; such that when the operator override control is activated, the rear collision controller does not send adjusted commands for the left and right side traction devices to the vehicle controller. The operator override control can be configured so that it must be held down by the operator to remain activated.

The sensors can be ultrasonic sensors, radar sensors, cameras, or other types of sensors. The sensors can be located on the tail end of the machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
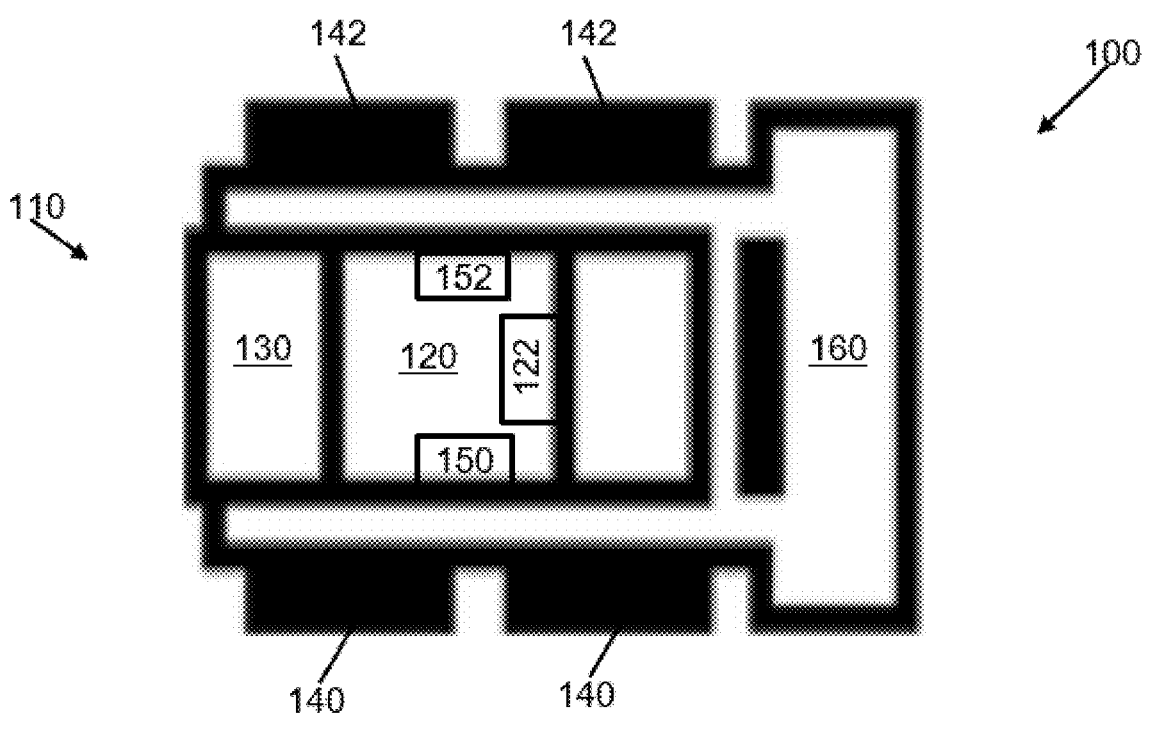
FIG. 1 illustrates an exemplary machine with differential steering.

FIG. 1 illustrates an exemplary machine 100 with differential steering that includes a body 110, an operator cab 120, an engine 130, right and left side traction devices 140, 142, right and left side drive assemblies 150, 152, and an attachment 160. The right and left side traction devices 140, 142 are in contact with the ground on opposite sides of the machine 100 and are used to move the machine 100. The right and left side traction devices 140, 142 can be wheels (as shown), tracks or other traction devices. For example, a skid steer loader has wheels and uses differential steering while a compact track loader has tracks and uses differential steering. In this disclosure, tracks or wheels are used interchangeably to encompass machines with any type of traction devices that can include tracks, wheels or other traction devices.

In the machine 100, the right side drive assembly 150 drives the right side traction devices 140, and the left side drive assembly 152 drives the left side traction devices 142, so the traction devices on different sides of the machine 100 can turn at different rates. This can enable the machine 100 to spin on its axis. The drive assemblies 150, 152 can be powered by the engine 130. The operation of the machine 100 and the attachment 160 are controlled from the operator cab 120 using operator controls 122.

The motion of a differentially steered machine with right and left side tracks can be thought of as having a propel or radial component, and a steer or transverse component which are commanded by the operator. In this disclosure, propel will be used to cover the substantially radial or forward/backward motion component, and steer will be used to cover the substantially transverse or lateral motion component. The propel component can be characterized by the average of the speeds of the tracks on both sides, and the steer component can be characterized by the difference of the speeds of the tracks on both sides. Rear collision avoidance can be achieved by limiting the rear propel speed based on the distance to detected obstacles.

Figure 2:
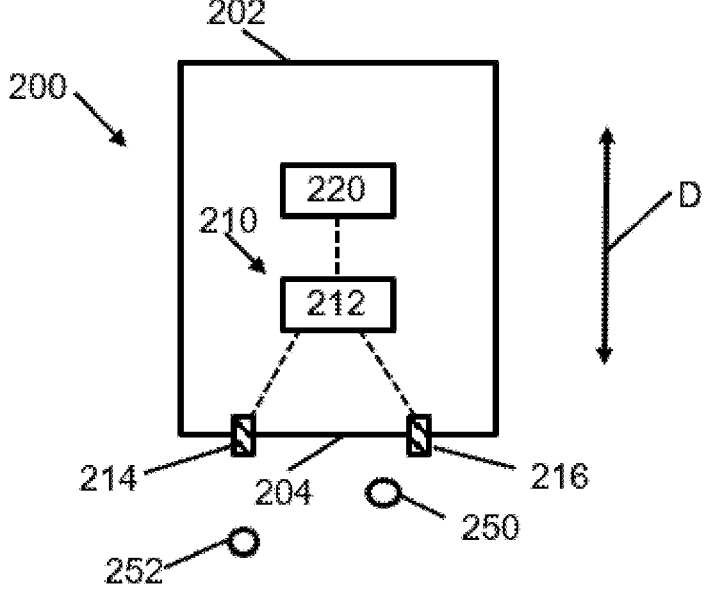
FIG. 2 illustrates a differentially steered machine with an exemplary embodiment of a rear collision avoidance system.

FIG. 2 illustrates an exemplary differentially steered machine 200 having a front end 202 and a rear end 204, that includes a vehicle controller 220 and an embodiment of a rear collision avoidance system 210. The vehicle controller 220 communicates with the operator controls 122 and sends commands to various systems on the vehicle 200.

The rear collision avoidance system 210 includes a rear collision controller 212, a first rear collision sensor 214 and a second rear collision sensor 216. The rear collision controller 212 is communicatively coupled to the rear collision sensors 214, 216; and the rear collision controller 212 is communicatively coupled to the vehicle controller 220. Communication can be wired or wireless. There can be one or more rear collision sensors. FIG. 2 also illustrates a first obstacle 250 and a second obstacle 252 detected by the rear collision sensors 210, 212.

The rear collision sensors 214, 216 are configured to detect obstacles behind the rear 204 of the machine 200, and send sensor readings to the rear collision controller 212. The rear collision sensors 214, 216 can be any of various sensor types for detecting the presence of obstacles, for example ultrasonic sensors, radar, cameras, etc. The rear collision avoidance system 210 can include any number of sensors, including sensors of different types, distributed across the vehicle to detect potential obstacles behind the machine 200. The rear collision controller 212 is configured to receive the sensor readings from the sensors 214, 216, determine whether an obstacle is behind the rear 204 of the vehicle 200, and if so whether an action should be initiated. The rear collision controller 212 is also configured to exchange information with the vehicle controller 220. If it is determined that an action should be initiated, the rear collision controller 212 is configured to send control signals to the vehicle controller 220 to implement the determined action.

In the scenario depicted in FIG. 2, based on the sensor readings received from the first and second rear collision sensors 214, 216, the rear collision controller 212 detects obstacles 250, 252 behind the machine 200. Based on information received from the vehicle controller 220, the rear collision controller 212 determines the operator's current commanded propel and steer components, and based on that the rear collision controller 212 determines the commanded path of the rear 204 of the machine 200. The rear collision controller 212 then calculates whether any of the obstacles 250, 252 are in the commanded path of the rear 204 of the machine 200. In this scenario, the rear collision controller 212 determines that both the first and second obstacles 250, 252 are in the commanded path of the rear 204 of the machine 200.

When the obstacles 250, 252 are detected in the commanded path of the rear 204 of the machine 200, the rear collision avoidance system 210 determines whether to perform an action to prevent or mitigate collision between the tail 204 of the machine 200 and the detected obstacles 250, 252. When a detected obstacle is far away, the rear collision avoidance system 210 does not limit the rear propel component of the machine 200, but as the obstacle gets closer, the rear collision avoidance system 210 will decrease the allowed rear propel component of the machine 200. The propel component of the machine 200 can be limited by overriding the operator-commanded track speeds. The rear collision avoidance system 210 may also limit the steer component in addition to the propel component.

Based on the distance to each of the obstacles 250, 252 and the operator's current commanded propel and steer components, the rear collision controller 212 can determine a time-to-collision (TTC) between the rear 204 of the machine 200 and each of the first and second obstacles 250, 252. If the time-to-collision (TTC) with any obstacle is below a TTC threshold, then the rear collision controller 212 initiates an action to avoid or mitigate collision with the obstacle. The action initiated by the rear collision controller 212 can depend on the current operator commanded propel and steer component.

If the current operator commanded reverse propel component is greater than a propel threshold, then the machine 200 is moving in reverse faster than a propel threshold. Limiting only the propel component would mean that the machine would start to rotate more, which is not likely the operator's intent. To prevent this unwanted rotation, the rear collision avoidance system 210 can limit the steer component in the same proportion that it limits the propel component. Put another way, the rear collision avoidance system 210 can limit the propel component to avoid or mitigate collision and limit the steer component so that the propel to steer ratio is the same as that commanded by the operator. In this way, the machine will be slowed or stopped to avoid or mitigate collision, but the operator intended path of the machine 200 will not be changed. This is called propel and steer limiting mode. Reverse propel is the component of the propel command that is to the rear of the vehicle 200 along the vector R shown in FIG. 3A. In the propel and steer limiting mode, the rear collision controller 212 can send control signals to the vehicle controller 220 to limit the reverse propel component to avoid or mitigate collision, and limit the steer component to maintain the propel-to-steer ratio. Maintaining the propel-to-steer ratio maintains the operator commanded path for the vehicle 200. This mode can prevent machine motion when a detected obstacle is extremely close to the rear 204 of the machine 200.

If the current operator commanded reverse propel component is less than the propel threshold, then the operator is likely trying to rotate or position the machine 200. In this case, the rear collision avoidance system 210 can limit the propel component but not alter the steer component. This allows the operator to still rotate the machine 200 even if an obstacle is very close to the rear 204 of the machine 200. This is called propel limiting mode. In the propel limiting mode, the rear collision controller 212 can send control signals to the vehicle controller 220 to limit the propel component to avoid or mitigate collision, but does not limit the steer component. This allows the machine 200 to be turned while avoiding rear collision. This mode can also prevent machine motion when a detected obstacle is extremely close to the rear 204 of the machine 200.

Figures 3A, 3B, 3C:
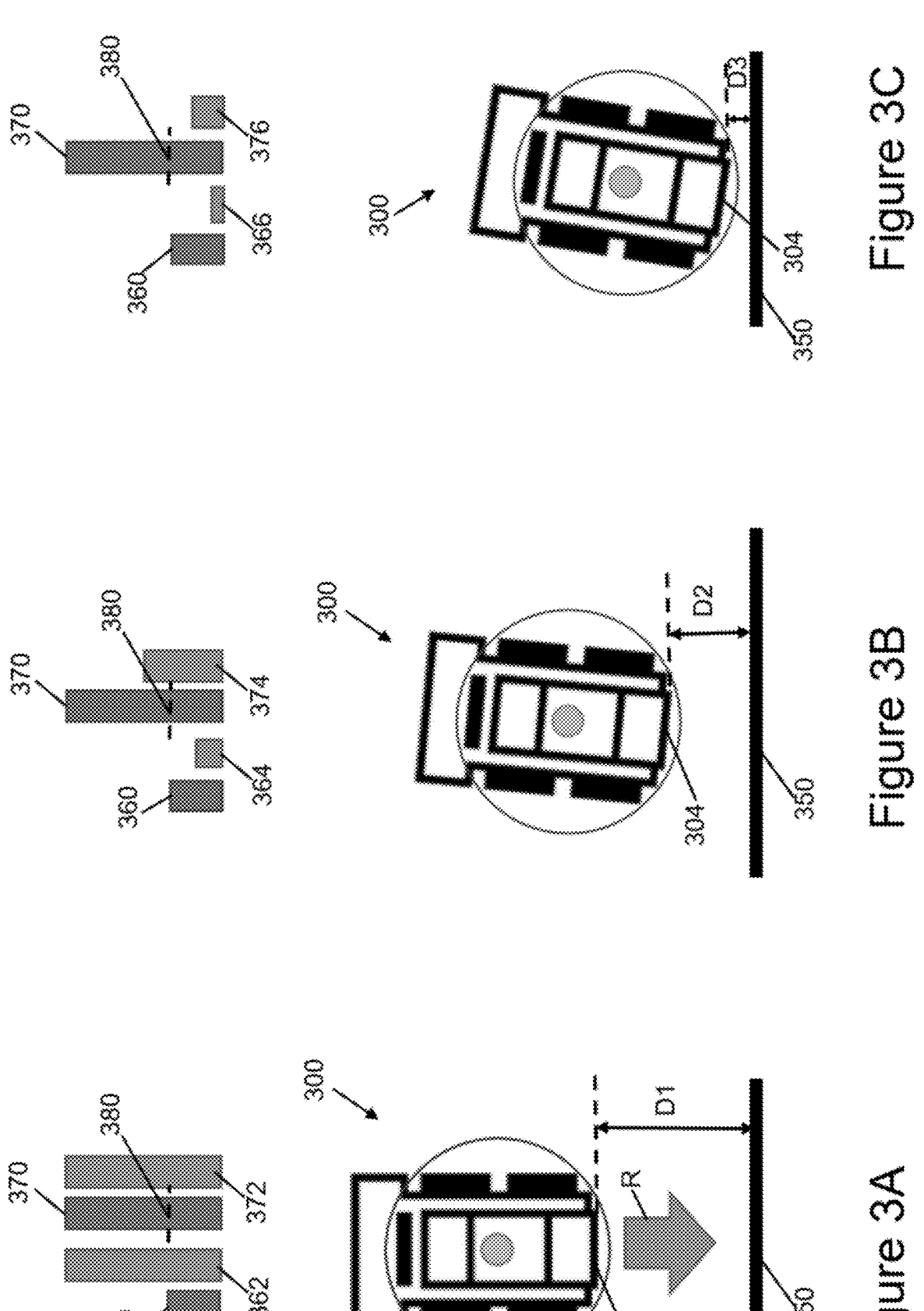
FIG. 3A illustrates an example of a differentially steered machine moving in reverse before the rear collision avoidance system is activated.
FIG. 3B illustrates the differentially steered machine moving in reverse approaching an obstacle after the rear collision avoidance system is activated to slow the machine.
FIG. 3C illustrates the differentially steered machine moving in reverse getting closer to the obstacle after the rear collision avoidance system is activated to further slow the machine.

FIGS. 3A-3C illustrate an example of the rear collision avoidance system 210 for a machine 300 in propel and steer limiting mode when the obstacle is a wall 350. In propel and steer limiting mode, the commanded reverse propel component is greater than the propel threshold, and the goal is to allow the machine 300 to continue moving along the operator's intended path, while avoiding collision with the wall 350. The propel and steer limiting mode modifies the reverse propel component to avoid or mitigate collision with the wall 350, and limits the steer component to maintain the propel-to-steer ratio.

FIG. 3A shows the machine 300 a distance D1 from the wall 350. The upper portion of FIG. 3A shows a current operator requested steer component 360 and a current operator requested reverse propel component 370. Since the operator requested reverse propel component 370 is greater than the reverse propel threshold 380, the rear collision avoidance system 210 can go into the propel and steer limiting mode. Based on the current operator requested reverse propel and steer components 360, 370 and the distance D1 to the obstacle 350, the rear collision avoidance system 210 can compute a time-to-collision (TTC) between the rear 304 of the machine 300 and the wall 350. Since the TTC is greater than a threshold TTC value, the rear collision avoidance system 210 determines that no change is required for the current operator requested steer and reverse propel components 360, 370. The rear collision avoidance system 210 allows a current allowed reverse propel component 372 that equals the operator requested reverse propel component 370, and a current allowed steer component 362 that equals the operator requested steer component 360.

FIG. 3B shows the machine 300 a distance D2 from the wall 350, where D2 is less than D1. Thus, the machine 300 is getting closer to the wall in FIG. 3B than it was in FIG. 3A. The upper portion of FIG. 3B shows the current operator requested steer component 360 and the current operator requested reverse propel component 370 have not changed. Since the operator requested reverse propel component 370 is still greater than the reverse propel threshold 380, the rear collision avoidance system 210 can remain in the propel and steer limiting mode. Based on the current operator requested steer and reverse propel components 360, 370 and the distance D2 to the obstacle 350, the rear collision avoidance system 210 computes a revised TTC between the rear 304 of the machine 300 and the wall 350. Obviously TTC is less in FIG. 3B than in FIG. 3A since the operator requested reverse propel component 370 is unchanged but the distance to the wall 350 has decreased to D2 from D1. Based on the lower computed TTC, the rear collision avoidance system 210 computes a revised allowed reverse propel component 374 that avoids collision with the wall 350. The revised allowed reverse propel component 374 is less than the operator requested reverse propel component 370. The operator requested steer component 360 is also limited to a revised allowed steer component 364 to maintain the operator requested propel-to-steer ratio. Thus, the rear collision avoidance system 210 sends commands to the vehicle controller 220 to cause the machine 300 to proceed with the revised allowed steer component 364 and the revised allowed reverse propel component 374, which slows the machine 300 down but keeps it on substantially the same path.

FIG. 3C shows the machine 300 a distance D3 from the wall 350, where D3 is less than D2. Thus, the machine 300 is getting closer to the wall in FIG. 3C than it was in either of FIG. 3A or 3B. The upper portion of FIG. 3C shows the current operator requested steer component 360 and the current operator requested reverse propel component 370 have not changed. Since the operator requested reverse propel component 370 is still greater than the reverse propel threshold 380, the rear collision avoidance system 210 can remain in the propel and steer limiting mode. Based on the current operator requested steer and reverse propel components 360, 370 and the distance D3 to the obstacle 350, the rear collision avoidance system 210 computes a further revised TTC between the rear 304 of the machine 300 and the wall 350. Obviously TTC is less in FIG. 3C than in FIG. 3B since the operator requested reverse propel component 370 is unchanged but the distance to the wall 350 has decreased to D3 from D2. Based on the lower computed TTC, the rear collision avoidance system 210 computes a further revised allowed reverse propel component 376 that maintains the threshold TTC and avoids collision with the wall 350. The further revised allowed reverse propel component 376 is less than the operator requested reverse propel component 370. The operator requested steer component 360 is also limited to a revised allowed steer component 366 to maintain the operator requested propel-to-steer ratio. Thus, the rear collision avoidance system 210 sends commands to the vehicle controller 220 to cause the machine 300 to proceed with the further revised allowed steer component 366 and the further revised allowed reverse propel component 376, which further slows the machine 300 down but keeps it on substantially the same path.

FIGS. 3A-3C illustrate three snapshots in time of the functioning of the rear collision avoidance system in propel and steer limiting mode. In actual operation, the rear collision avoidance system can continuously be computing revised TTC estimates in close to real time, and continuously be revising the allowed reverse propel component and the allowed steer component. Propel and steer limiting mode can be helpful to the operator because it allows them to reverse towards walls or other obstacles without worrying about hitting the obstacle because the rear collision avoidance system stops them before the collision. Note that the rear collision avoidance system 210 does not use the brakes but rather slows and eventually stops the machine 300 by reducing speed.

Figure 4:
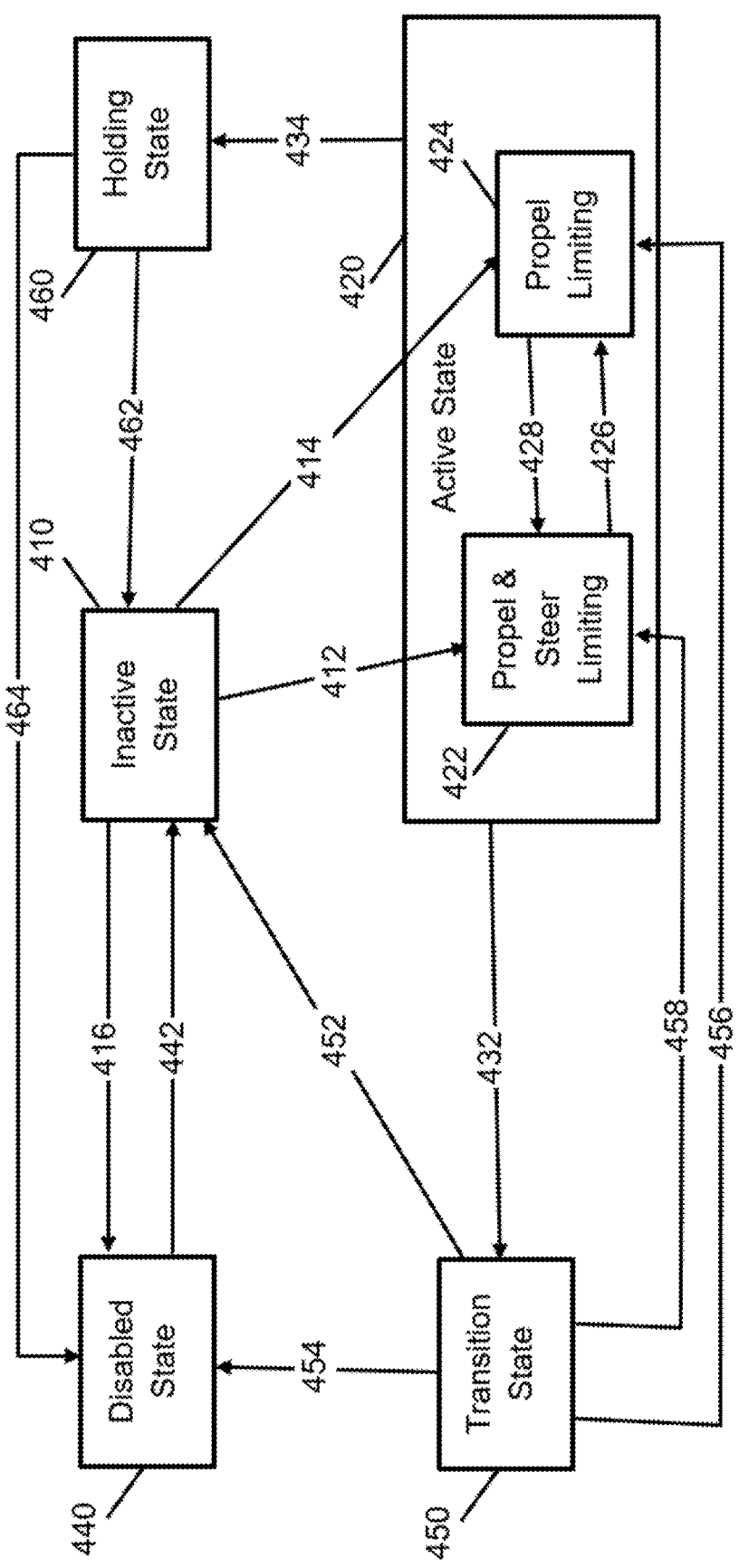
FIG. 4 illustrates an exemplary state diagram for a rear collision avoidance system.

FIG. 4 illustrates an exemplary state diagram for the rear collision avoidance system 210. The system starts in an inactive state 410, where the rear collision avoidance system 210 is not modifying the track or wheel speeds from the operator requested commands.

If the rear collision avoidance system 210 determines that the operator requested reverse propel component is greater than the allowed reverse propel component, then the collision avoidance system 210 moves from the inactive state 410 to an active state 420 along one of paths 412 or 414. If the operator requested propel component is greater than the propel threshold, then the system moves from the inactive state 410 to the active state 420 along the path 412 to be in a propel and steer limiting mode 422. If the operator requested propel component is less than or equal to the propel threshold, then the system moves from the inactive state 410 to the active state 420 along the path 414 to be in a propel limiting mode 424.

If while in the inactive state 410, the operator overrides the rear collision avoidance system 210, then the system moves along a path 416 from the inactive state 410 to a disabled state 440. Several methods can be implemented to enable the operator to override the rear collision avoidance system 210, for example by having an override button as part of the operator controls 122 in the cab 120, and allowing the operator to override the rear collision avoidance system 210 by holding down the override button.

In the propel and steer limiting mode 422, the system modifies the operator requested track speeds to limit the reverse propel component and limit the steer component proportionally so the machine performs the operator's intended maneuver while slowing and eventually stopping to avoid collision. If while in the propel and steer limiting mode 422, the operator requested propel component becomes less than or equal to the propel threshold, the system moves along a path 426 from the propel and steer limiting mode 422 to the propel limiting mode 424.

In the propel limiting mode 424, the system modifies the operator requested track speeds to limit the reverse propel component. If while in the propel limiting mode 424, the operator requested propel component becomes greater than the propel threshold, the system moves along a path 428 from the propel limiting mode 424 to the propel and steer limiting mode 422.

If while in the active state 420, in either of the propel and steer limiting mode 422 or the propel limiting mode 424, the both track speeds go to zero then the rear collision avoidance system 210 moves from the active state 420 along the path 434 to a holding state 460.

If while in the active state 420, in either of the propel and steer limiting mode 422 or the propel limiting mode 424, the time to collision (TTC) becomes greater than a TTC threshold or the operator overrides the rear collision avoidance system 210, then the collision avoidance system moves from the active state 420 along the path 432 to a transition state 450. The TTC threshold can be any value, for example 4 seconds, determined to enable the rear collision avoidance system 210 to react to mitigate or avoid obstacle collisions.

In the disabled state 440, the system does not modify the operator requested track speeds. If while in the disabled state 440, the operator is not overriding the collision avoidance system 210 and no faults are detected with the collision avoidance system 210, then control moves from the disabled state 440 to the inactive state 410 along the path 442.

In the transition state 450, the system allows the machine to accelerate to the operator requested speed at limited acceleration. If while in the transition state 450, the machine velocity matches the operator requested velocity and the operator is not overriding the collision avoidance system 210, then control moves from the transition state 450 to the inactive state 410 along the path 452. If while in the transition state 450, the machine velocity matches the operator requested velocity and the operator is overriding the collision avoidance system 210, then control moves from the transition state 450 to the disabled state 440 along the path 454.

If while in the transition state 450, the operator requested reverse propel component exceeds the allowed reverse propel component, and the operator is not overriding the collision avoidance system, then the system moves from the transition state 450 to the active state 420 along one of paths 456 or 458. If in this situation, the operator requested propel component is greater than the steer component then the system moves from the transition state 450 to the active state 420 along the path 458 to be in the propel and steer limiting mode 422. If in this situation, the operator requested steer component is greater than or equal to the propel component, then the system moves from the transition state 450 to the active state 420 along the path 456 to be in the propel limiting mode 422.

In the holding state 460, the system commands both track speeds to zero. If while in the holding state 460, the operator puts the machine into neutral, then control moves from the holding state 460 to the inactive state 410 along the path 462. If while in the holding state 460, the operator starts overriding the collision avoidance system 210, then control moves from the holding state 460 to the disabled state 440 along the path 464.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A rear collision avoidance method for a machine having left and right side traction devices for moving the machine, the machine also having a front end and a tail end, the method comprising:
   monitoring obstacles behind the machine using sensors;
   monitoring operator traction device commands for the left and right side traction devices;
   determining an operator commanded reverse path for the machine based on the operator traction device commands, the operator commanded reverse path including an operator commanded reverse propel component for the machine and an operator commanded steer component for the machine;
   determining whether an obstacle detected by the sensors is in the operator commanded reverse path; and
   when the obstacle is in the operator commanded reverse path, automatically adjusting the operator traction device commands to avoid collision with the obstacle, wherein automatically adjusting the operator traction device commands to avoid collision with the obstacle comprises:
      if the operator commanded reverse propel component is greater than a propel threshold, adjusting the operator traction device commands to reduce the reverse propel component to avoid collision with the obstacle while maintaining the operator commanded reverse path; and
      if the operator commanded reverse propel component is less than or equal to the propel threshold, adjusting the operator traction device commands to reduce the reverse propel component to avoid collision with the obstacle.

2. The rear collision avoidance method of claim 1, wherein automatically adjusting the operator traction device commands to avoid collision with the obstacle comprises:
   determining a time to collision with the obstacle based on the operator traction device commands; and
   if the time to collision with the obstacle is below a time to collision threshold, automatically adjusting the operator traction device commands to avoid collision with the obstacle.

3. The rear collision avoidance method of claim 1, wherein adjusting the operator traction device commands to reduce the reverse propel component to avoid collision with the obstacle while maintaining the operator commanded reverse path comprises:
   calculating an allowed reverse propel component that avoids collision with the obstacle based on the time to collision with the obstacle;
   calculating an allowed steer component so that the ratio of the allowed reverse propel component to the allowed steer component is substantially the same as the ratio of the operator commanded reverse propel component to the operator commanded steer component; and
   adjusting the operator commands for the left and right side traction devices to implement the calculated allowed reverse propel component and the calculated allowed steer component.

4. The rear collision avoidance method of claim 3, wherein adjusting the operator traction device commands to reduce the reverse propel component to avoid collision with the obstacle comprises:

maintaining the operator commanded steer component; and reducing the operator commanded reverse propel component to avoid collision with the obstacle.

5. The rear collision avoidance method of claim 1, wherein adjusting the operator traction device commands to reduce the reverse propel component to avoid collision with the obstacle comprises:

maintaining the operator commanded steer component; and reducing the operator commanded reverse propel component to avoid collision with the obstacle.

6. The rear collision avoidance method of claim 1, wherein adjusting the operator traction device commands to reduce the reverse propel component to avoid collision with the obstacle while maintaining the operator commanded reverse path comprises:

continuously monitoring the operator commands for the left and right side traction devices;

continuously determining the operator commanded reverse propel component for the machine based on the latest operator commands for the left and right side traction devices;

continuously determining the operator commanded steer component for the machine based on the latest operator commands for the left and right side traction devices;

continuously determining the operator commanded reverse path for the machine based on the latest operator commands for the left and right side traction devices;

continuously determining whether the obstacle detected by the sensors is in the operator commanded reverse path;

continuously determining a time to collision with the obstacle;

if the time to collision with the obstacle is below the time to collision threshold:

continuously adjusting the operator traction device commands to reduce the reverse propel component to avoid collision with the obstacle.

7. The rear collision avoidance method of claim 1, further comprising:

checking for an operator override command; and when the operator override command is detected, not adjusting the operator commands for the left and right side traction devices to avoid collision with the obstacle.

8. A rear collision avoidance system for a machine that has left and right side traction devices to move the machine, and that has a front end and a tail end, and a vehicle controller, the tail swing collision avoidance system comprising:

sensors configured to detect obstacles behind the machine;

a rear collision controller configured to monitor operator commands for the left and right side traction devices, determine an operator commanded reverse path for the machine based on the operator commands for the left and right side traction devices, the operator commanded reverse path including an operator commanded reverse propel component for the machine and an operator commanded steer component for the machine, and determine whether an obstacle detected by the sensors is in the operator commanded reverse path;

wherein when the obstacle is in the operator commanded reverse path, the rear collision controller is configured to adjust the operator commands for the left and right side traction devices to avoid collision with the obstacle, wherein if the operator commanded reverse propel component is greater than a propel threshold, the rear collision controller is configured to adjust the operator commands for the left and right side traction devices to reduce the reverse propel component to avoid collision with the obstacle and maintain the operator commanded reverse path; and if the operator commanded reverse propel component is less than or equal to the propel threshold, the rear collision controller is configured to adjust the operator commands for the left and right side traction devices to reduce the reverse propel component to avoid collision with the obstacle.

9. The rear collision avoidance system of claim 8, wherein if the obstacle is in the operator commanded reverse path, the rear collision controller is configured to determine a time to collision with the obstacle based on the operator commands for the left and right side traction devices; and only adjust the operator commands for the left and right side traction devices when the time to collision with the obstacle is below a time to collision threshold.

10. The rear collision avoidance system of claim 8, wherein if the operator commanded reverse propel component is greater than the propel threshold, the rear collision controller is configured to calculate an allowed reverse propel component that avoids collision with the obstacle; calculate an allowed steer component so that the ratio of the allowed reverse propel component to the allowed steer component is substantially the same as the ratio of the operator commanded reverse propel component to the operator commanded steer component; and adjust the operator commands for the left and right side traction devices to implement the calculated reverse propel component and the calculated steer component.

11. The rear collision avoidance system of claim 10, wherein if the operator commanded reverse propel component is less than or equal to the propel threshold, the rear collision controller is configured to maintain the operator commanded steer component, and reduce the operator commanded reverse propel component to avoid collision with the obstacle.

12. The rear collision avoidance system of claim 8, wherein if the operator commanded reverse propel component is less than or equal to the propel threshold, the rear collision controller is configured to maintain the operator commanded steer component, and reduce the operator commanded reverse propel component to avoid collision with the obstacle.

13. The rear collision avoidance system of claim 8, wherein the rear collision controller is configured to communicate with the vehicle controller to monitor the operator commands for the left and right side traction devices.

14. The rear collision avoidance system of claim 8, wherein the rear collision controller is configured to send adjusted commands for the left and right side traction devices to the vehicle controller to avoid collision with the obstacle.

15. The rear collision avoidance system of claim 14, further comprising an operator override control; and when the operator override control is activated, the rear collision controller is configured to not send adjusted commands for the left and right side traction devices to the vehicle controller.

16. The rear collision avoidance system of claim 15, wherein the operator override control must be held down by the operator to remain activated.

17. The rear collision avoidance system of claim 8, wherein the sensors are ultrasonic sensors.

18. The rear collision avoidance system of claim 8, wherein the sensors are located on the tail end of the machine.

\* \* \* \* \*